Patented June 19, 1934

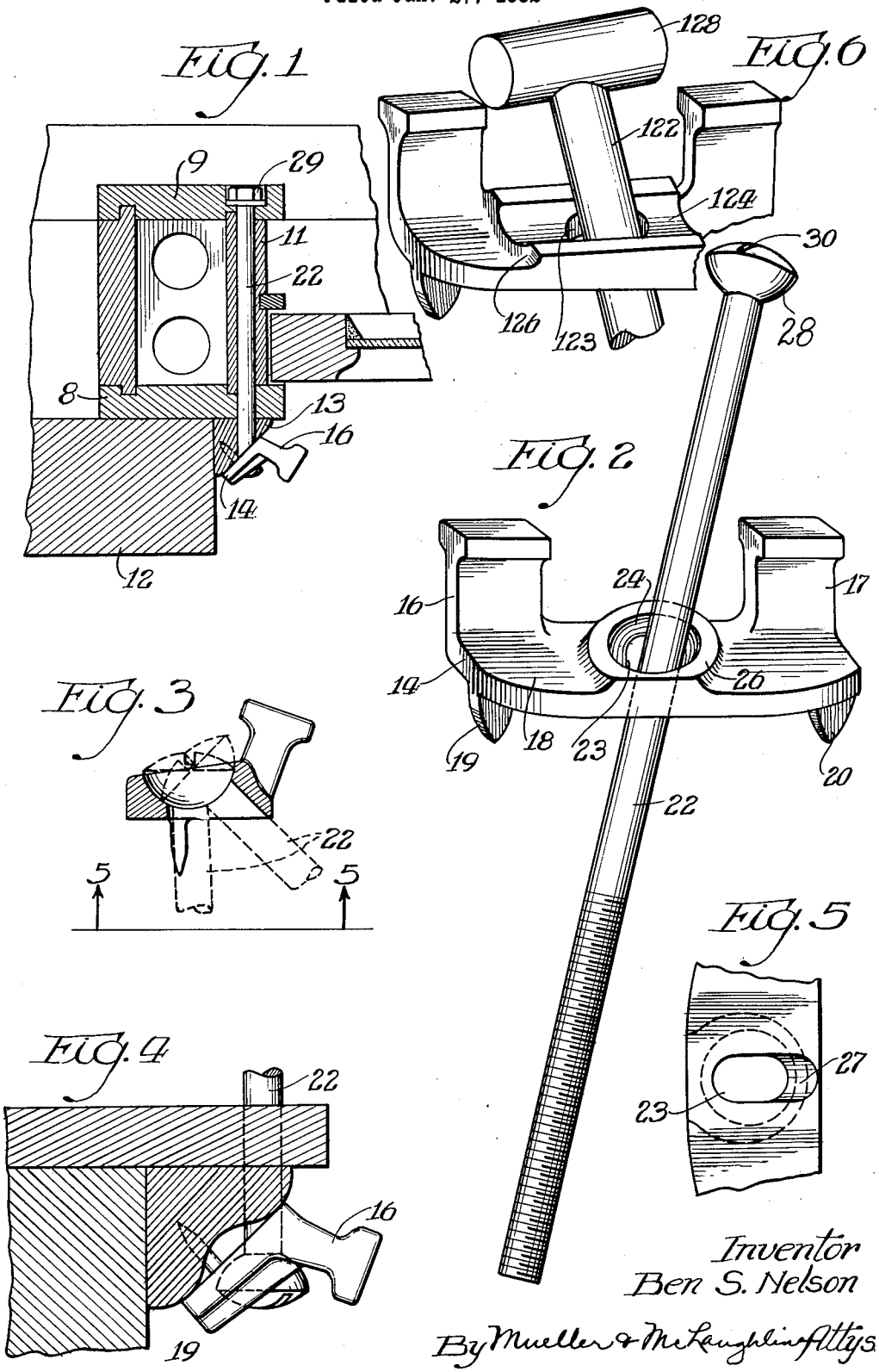

1,963,799

UNITED STATES PATENT OFFICE 1,963,799

WINDOW CLEANER'S SAFETY DEVICE

Ben S. Nelson, Oak Park, Ill.

Application January 27, 1932, Serial No. 589,131

1 Claim. (Cl. 20—72)

My invention relates in general to window-washers' safety devices, and particularly to an attaching device to which a window-washer may fasten his safety belt while working on a particular window.

In the past galvanized iron lag screws and ordinary eye bolts have been screwed into the window casing as an attaching means for safety belts, together with other similar devices which in time pulled out of the casing or broke off, endangering the lives of the workmen. As a result insurance underwriters are now requiring that the attaching devices be secured to the window casing by means of bolts. The use of bolts in connection with these attaching devices presents new problems in their installation in view of the varied design in window, and window casing construction, inasmuch as the attaching device must be firmly secured without marring the appearance of the casing in each of the various designs.

An object of my invention is to provide an improved attaching device to which a window-washer's safety belt may be fastened.

A further object is to provide an attaching device which is adapted to be readily and securely anchored to any window casing regardless of the contour of the window casing or moulding.

It is also an object to provide an attaching device with a removable bolt for anchoring to a window casing without marring the appearance of same, and A further object is to provide an attaching device having a bolt pivotally connected to the anchoring plate of the device so as to attach the plate of the attaching device at various transverse angles.

Other objects and advantages will appear as the description proceeds.

Referring to the drawing:

Fig. 1 is a cross-sectional view of a window casing showing an installation of my attaching device;

Fig. 2 is a perspective view of the attaching device;

Fig. 3 is a fragmentary view of the head of the device showing the bolt in various positions in the pivotal joint;

Fig. 4 is a fragmentary enlarged view of the attaching device anchored in a moulding with the head of the device at an angle with the bolt;

Fig. 5 is a fragmentary view of the head of the device looking in the direction of the arrows in Fig. 3; and Fig. 6 is a fragmentary view of a modification of my device.

At the present time underwriters require almost universally that attaching devices to which window washers' safety belts are secured must be anchored to a window casing by means of bolts extending through the jamb of the window to a specified depth. This has made necessary the replacement of obsolete equipment on buildings having window casings of every description. It has also made necessary the installation of an attaching device to meet the underwriters' specifications on new buildings where mouldings and casings of windows cannot be designed principally with the object of making it easy for the installation of an attaching device. As a result, a contractor installing such attaching devices in order to be prepared to render efficient and prompt service must carry a large stock on hand at all times. These attaching devices must have bolts of different lengths on heads cast at various angles with the shank of the bolt, in all, creating a cumbersome situation for the contractor and in turn increasing his costs. It has been the practice when installing a device where the anchoring plate must be set at an angle with the bolt in order to fit the particular moulding, to bend the bolt near the plate, at the particular angle desired. However, this requires additional time and is a very dangerous practice for often the bolt later breaks at that bend.

In the present invention I have provided an attaching device which may be securely anchored to a building, and of such a construction that it will necessitate the contractor carrying only a very limited stock in order to make an installation on a building with any design of window casing and moulding.

In Fig. 1 my invention is shown in an ordinary installation on a window casing comprising an outer board 8, and an inner board 9 connected by a jamb 11. Reference character 12 designates the brick or concrete outer surface of the building with a moulding 13 fitted into the corner formed by the board 8 and wall 12. The attaching device as illustrated comprises an anchoring plate 14 from which lugs 16 and 17 with enlarged heads project from the outer face 18, and prongs 19 and 20 project from the opposite or under face. A bolt 22 is inserted through an aperture 23 in the anchor plate 14, such bolt being used to secure the anchoring plate to the building.

The jamb 11 in Fig. 1, as in all window casings is at right angles with the outer board 8, and inasmuch as the jamb is of limited thickness, a hole horizontally through the jamb must be drilled at right angles to the outer board. Thus if the moulding 13, as shown in Fig. 1 has a face at a 45° angle with the horizontal when installing an attaching device either the moulding must be cut away to provide a surface parallel to the outer board, or the anchoring plate must be at an angle of 45° with the bolt securing the device to the building. In the first case the appearance of the window would be marred by cutting the moulding, while in the second case it would be necessary to have an attaching device at the particular angle of the moulding, or an insecure abutment might result. I have overcome this problem by providing a socket 24 in a boss 26 extending above the upper surface 18 of the anchoring plate 14.

The aperture 23 in the socket 24 is shown more clearly in Fig. 5, with the rear portion 27 of the aperture cut at an angle such that the bolt 22 may take the position shown in Fig. 3.

With the spherical under-surface 28 of the head of the bolt adapted to seat in the socket 24, and the aperture 23 designed as described, the pivotal joint between the bolt and anchoring plate makes it possible to secure the attaching device to a moulding of any configuration and still obtain the maximum anchoring, inasmuch as the bolt 22 will pivot to any desired transverse angle with the anchoring plate 14.

Thus in the installation of my device a hole is first drilled through the moulding 13, the outer board 8, and the jamb 11. The bolt 22 is inserted through the aperture 23 in the anchoring plate 14, and then inserted in the hole drilled in the window casing (Fig. 1). The bolt 22 is pulled up by screwing the nut 29 thereon, while at the same time holding the bolt from turning by inserting a screw driver or similar tool in the slit 30 in the head of the bolt. Pulling the bolt 22 up, seats the surface 28 in the socket 24, and forces the prongs 19 and 20 into the moulding 13. Because of the pivotal joint between the bolt 22 and anchoring plate 14 the anchoring plate adjusts itself to the particular configuration of the moulding so that the under surface of the anchoring plate 14 makes a maximum contact with the surface of the moulding, and the prongs 19 and 20 dig into the moulding, thus increasing the anchorage to the same and preventing the plate from moving. At the same time the bolt 22 seats perfectly in the socket 24, at any angle of the plate 14. The boss 26 raised around the socket 24 increases the strength of the joint so that the plate 14 will not break across that portion when pressure is brought to bear by pulling up the bolt. The operation of the device is also shown on an O. G. curved moulding in Fig. 4.

It will be seen from the foregoing description that with my invention it will be necessary for a contractor installing attaching devices to carry only one type anchor plate in stock, and perhaps two or three sizes of bolts in order to fill any order he might have, thus decreasing his costs, and enabling him to render better service. The manufacturer of the attaching device may also reduce his costs, for, with the use of my device he may do a volume business on one casting without the necessity of carrying and casting or drop forging innumerable patterns of combined anchoring plates and bolts.

Fig. 6 illustrates a modification of my invention in which the head 128 of the bolt 122 is formed as a cross head or cross bar on the shank of the bolt and set at right angles thereto. This circular head 128 seats in a channel socket 124 in the center of which is an aperture 123 similar to aperture 23 in anchor plate 14, through which the bolt 122 extends, with said socket formed in a boss 126. The pivotal joint so formed, limits the movement of the bolt 122 in a transverse plane. With the longitudinal head 128 it is not necessary to use any tool on the bolt to prevent it turning while tightening the nut on the opposite end, and this construction gives a very strong pivotal joint.

Although I have described my invention as an attaching device for window-washers safety belts it is recognized that the device may be used by workmen generally on buildings where a safety belt or other means of support is used which may be hooked to the enlarged ends on the lugs 16 and 17 protruding from the anchor plate 14.

It is also understood that the embodiment of the invention herein described and disclosed is merely a convenient and useful form of the invention, and that many modifications and changes may be made without departing from the spirit and scope of the invention.

What I claim as new and desire to protect by United States Letters Patent is:

A window washer's safety appliance for mounting on a window casing irrespective of the design of the outside molding on said casing, said appliance comprising an anchoring plate having a pair of headed attachment lugs extending outwardly therefrom and an intermediately disposed rounded seat to receive the head of an anchoring bolt, a headed anchoring bolt for securing the plate to the window casing having a rounded under surface on said head to fit said seat for providing substantially universal movement between the plate and bolt, whereby said anchoring plate may be applied at different angles against outside casing moldings of different designs, said bolt head having means for tightening the bolt from the outside of the window casing to more firmly anchor the plate and compensate for shrinkage in the window casing for maintaining the plate firmly anchored at all times.

BEN S. NELSON.